FIG. 2

INVENTOR
BERNARD D. LOUGHLIN
BY Harry B. Page
ATTORNEY Oct. 21, 1947. B. D. LOUGHLIN 2,429,519
RADIANT-ENERGY SIGNAL DIRECTION FINDER
Filed Sept. 20, 1943 4 Sheets-Sheet 3

INVENTOR
BERNARD D. LOUGHLIN
BY
ATTORNEY

Oct. 21, 1947.                B. D. LOUGHLIN                2,429,519
              RADIANT-ENERGY SIGNAL DIRECTION FINDER
                   Filed Sept. 20, 1943            4 Sheets-Sheet 4

INVENTOR
BERNARD D. LOUGHLIN
BY *Harry C. Page*
ATTORNEY

Patented Oct. 21, 1947

2,429,519

UNITED STATES PATENT OFFICE 2,429,519

RADIANT-ENERGY SIGNAL DIRECTION FINDER

Bernard D. Loughlin, Bayside, N. Y., assignor, by mesne assignments, to Hazeltine Research, Inc., Chicago, Ill., a corporation of Illinois Application September 20, 1943, Serial No. 503,069

19 Claims. (Cl. 250—11)

The present invention pertains to a direction finder for determining the direction of reception, or bearing, of a particular radiant-energy signal.

Many prior art arrangements have been proposed for determining the direction of reception of a radiant-energy signal. One such prior art arrangement is described in copending application, Serial No. 423,514, filed December 18, 1941, now Patent No. 2,407,281 issued Sept. 10, 1946, in the name of J. Kelly Johnson et al. and assigned to the same assignee as the present invention. The direction finder there disclosed comprises a receiving pick-up system having a directive pattern, means for controlling the pick-up system to cause the directive pattern to rotate, a line-tracing device, and means for synchronizing the line-tracing device with the rotation of the directive pattern. The arrangement further comprises means responsive to the amplitude of a signal received by the pick-up system for shifting the line traced by the line-tracing device in accordance with the directive pattern, and means for cyclically displacing the line traced by the line-tracing device at a frequency which is high with reference to the frequency at which the directive pattern is rotated, thereby to trace intersecting lines sharply indicative of the direction of reception of the received signal.

In general, the operation of the described arrangement is entirely satisfactory when only a few signals are received during a 360-degree rotation of the antenna directive pattern. However, when several signals are received during such rotation, the direction-finder pattern produced by the line-tracing device may be complex and it may be difficult to obtain accurate bearing indications of any particular one of the received signals. The present invention constitutes an improvement on the above-mentioned copending application of J. Kelly Johnson et al.

It is, therefore, an object of the invention to provide an improved direction finder for determining the direction of reception of a radiant-energy signal which substantially avoids the above-mentioned limitation of the described prior art arrangement.

It is another object of the invention to provide an improved direction finder including a pick-up system having a directive pattern which is caused to rotate through a predetermined azimuth and in which a direction-finder pattern may be produced only during a predetermined fractional portion of the azimuthal rotation of the directive pattern.

In accordance with the invention, a direction finder for determining the direction of reception of a particular radiant-energy signal comprises a pick-up system having a directive pattern and means for controlling the pick-up system to cause the directive pattern to rotate through a predetermined azimuth. The direction finder also includes line-tracing means and means for controlling the line-tracing means to trace a line at a frequency which is related to the frequency of rotation of the directive pattern by an integer greater than unity. Additionally, there is included in the direction finder means responsive only to the amplitude of signals picked up within a predetermined fractional portion of the directive pattern azimuthal rotation for shifting the line traced by the line-tracing means in accordance therewith to trace at least a portion of the directive pattern.

A direction finder in accordance with the invention includes a pick-up, or antenna, system having a directive pattern. The antenna system is rotated, thereby to cause its directive pattern to rotate through an azimuth of 360 degrees. The direction finder also includes a line-tracing arrangement from which bearing indications are obtained comprising a pair of cathode-ray devices. The cathode-ray beam of the first device is controlled to trace a circular path in synchronism with the rotation of the directive pattern. The beam of the second device is controlled to trace a circular path at a frequency related to the frequency of rotation of the directive pattern by an integer greater than unity, this integer being 4 in a preferred embodiment. The radius of the circular path traced by the first device is modulated in accordance with the amplitudes of all signals picked up during the directive pattern rotation and thus the first device traces the directive pattern with reference to the direction of reception of each received signal. However, the radius of the circular path traced by the second device is modulated only in response to the amplitude of a particular signal picked up within a predetermined fractional portion of such azimuthal rotation, for example 90 degrees, so that this second device traces the directive pattern with reference to such particular received signal. While the beam of the second device is tracing the directive pattern, it is periodically displaced at a high frequency to produce intersecting directive patterns. The intersections of these patterns, with reference to scale divisions representing different predetermined positions of the antenna, accurately determine the bearing of the particular signal. Further, that portion of the cally coupled to oscillation generators 35 and 36, respectively, and mechanically coupled with antenna system 20, 21. The construction of these devices as well as their electrical and mechanical coupling arrangements are generally similar to corresponding devices included in a position-indicating system described in copending application Serial No. 503,072, filed concurrently herewith in the names of Bernard D. Loughlin et al., now Patent 2,404,238, issued July 16, 1946, and assigned to the same assignee as the present application. More specifically, each device 30, 31, represented schematically in the drawings, comprises relatively movable primary and secondary elements, the relative position of which determines the electrical coupling therebetween. The primary elements are fixed or stationary and are thus effectively mechanically coupled to the supporting structure (not shown) of antenna system 20, 21. The secondary elements are arranged for rotation within their associated primary elements, being mechanically coupled with antenna system 20, 21 for rotation in synchronism therewith, as indicated by broken line 24.

Oscillation generators 35 and 36 supply oscillations of a frequency much greater than the maximum frequency of rotation of antenna system 20, 21. Inductive-coupling devices 30 and 31 are utilized to vary the operating frequencies of oscillators 35 and 36, respectively, in accordance with the rotation of antenna system 20, 21. This may be accomplished in any well-known manner as, for example, by individually including one such coupling device in a quadrature-phase voltage feed-back circuit of one of the oscillators, as disclosed in the Loughlin et al. application referred to above. The described means produce two frequency-modulated control signals, one having a mean carrier frequency $f_1$ corresponding to the nominal operating frequency of oscillation generator 35 and the other having a mean carrier frequency $f_2$ corresponding to the nominal operating frequency of oscillation generator 36. These control signals are utilized in means included in the remote line-tracing arrangement, to be described hereinafter, for controlling the beam deflection of line-tracing device 57.

The means included in signal generator 46 for controlling line-tracing device 63 is substantially the same as that just described. This means, in the illustrated embodiment, comprises additional inductive-coupling devices 30' and 31' electrically coupled with additional oscillation generators 35' and 36' and mechanically coupled with antenna system 20, 21. However, the secondary elements of devices 30', 31' are mechanically coupled with antenna system 20, 21 through such a speed-changing device that the secondary elements thereof are driven at four times the speed of the antenna system. This coupling arrangement includes a gear train 32, 33, gear 32 being rotated with the antenna system as indicated by broken line 24, and gear 33 being coupled to the secondary elements of devices 30', 31', as indicated by broken line 34. The means under consideration produce additional frequency-modulated control signals having mean carrier frequencies $f_3$ and $f_4$ which correspond, respectively, to the nominal operating frequencies of oscillation generators 35' and 36'. These signals are suitable for controlling the beam of line-tracing device 63 of Fig. 2.

Signal generator 46 also includes means for producing scale divisions on the screen of line-tracing device 63, which divisions individually correspond to different predetermined positions of antenna system 20, 21 and facilitate obtaining bearing indications from the direction finder. Such means comprise a phase modulator 37 mechanically coupled with antenna system 20, 21 and electrically coupled with an oscillation generator 40. The design of modulator 37 and its coupling arrangements may be generally similar to the phase modulator included in the marker system forming the subject matter of copending application Serial No. 503,070, filed concurrently herewith in the name of Bernard D. Loughlin, and assigned to the same assignee as the present invention. In particular, modulator 37, which is represented schematically, consists of an inductive-coupling device having a pair of primary elements positioned in mutually perpendicular planes and a secondary element inductively coupled to and mounted for rotation within such primary elements. While the primary elements are fixed or stationary, the secondary element is mechanically coupled with antenna system 20, 21 for rotation therewith through a mechanical coupling arrangement including a gear train 32, 38 and a suitable driving shaft indicated by broken line 39. The gear train is selected to drive the secondary element at twelve times the frequency of antenna rotation.

The primary elements of modulator 37 are so electrically coupled with oscillator 40 as to be excited in phase quadrature. Oscillation generator 40 supplies a carrier signal which comprises reference oscillations having a sinusoidal waveform and a frequency $f_0$ much greater than the maximum frequency of rotation of the secondary element of device 37. A phase-modulated carrier signal is obtained from modulator 37, being taken directly from its secondary element. This output signal comprises oscillations, hereinafter, referred to as comparative oscillations, which are induced in the secondary element in response to the excitation of the primary elements. The comparative oscillations obtained from modulator 37 are utilized in means, described hereinafter, included in the remote line-tracing arrangement for deriving marker signals which produce the desired scale divisions.

Figure 2:
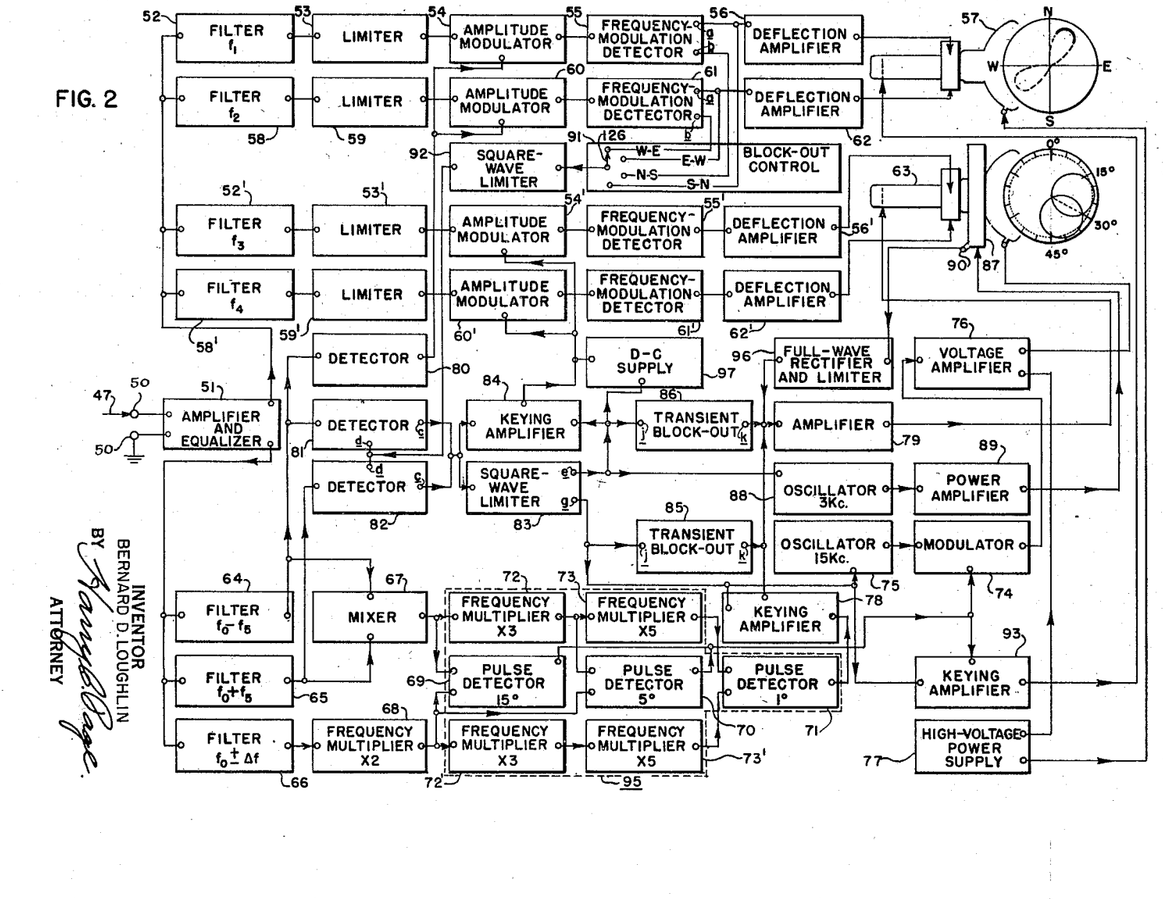

In deriving the marker signals in the receiver of Fig. 2, it is preferred to compare the relative phase of the comparative oscillations from phase modulator 37 with the reference oscillations produced in oscillation generator 40. For this purpose it is expedient to include in signal generator 46 an arrangement for producing reference-signal components suitable for providing a phase-reference signal to be utilized in making such a phase comparison at the remote line-tracing arrangement. The reference-signal components are developed in a balanced amplitude modulator 41 having one input circuit coupled to oscillation generator 40 and another input circuit coupled to a further oscillation generator 42 which supplies an amplitude-modulating signal having a frequency $f_5$, defined more particularly hereinafter. The output circuit of modulator 41 is designed to select only the upper and the lower sidebands of amplitude modulation. The developed modulation components have predetermined phase relations with reference to the carrier signal from oscillator 40 and hence are suitable phase-reference signal components.

An additional amplitude modulator 43 is included in the arrangement under consideration, having input circuits individually coupled to the output circuit of balanced modulator 41 and direction-finder receiver 25. Modulator 43 provides means for amplitude-modulating the phase-reference signal components in accordance with the output signal of receiver 25 so that the output signal of this receiver may be conveniently translated to the remote line-tracing arrangement. It is preferred that units 40—43, inclusive, be generally similar to the arrangement for translating phase-reference signal components described in copending application Serial No. 503,071, filed concurrently herewith in the name of Bernard D. Loughlin, now Patent 2,403,385, issued July 16, 1946, and assigned to the same assignee as the present invention.

The output circuits of units 35, 35', 36, 36', 37 and 43 are coupled to the input circuit of a combining amplifier 44. The output circuit of amplifier 44 connects with input terminals 45, 45 of signal-translating channel 47 for applying the signals amplified therein to channel 47.

Referring now more particularly to Fig. 2, the line-tracing arrangement comprises the pair of cathode-ray tubes 57 and 63 previously mentioned. While these tubes are of conventional construction, having screen surfaces perpendicular to their longitudinal axes, their representation is distorted in the drawing in order that the screens may appear more clearly. The arrangement also comprises an amplifier and equalizer 51 coupled to output terminals 50, 50 of the signal-translating channel for selectively amplifying the components of the received signal to compensate for any nonuniform frequency-response characteristics of the channel.

As previously indicated, means are provided for utilizing certain of the received control signals to cause the line-tracing means to trace a first line in synchronism with the rotation of the antenna directive pattern. This means consists of horizontal and vertical deflection channels associated, respectively, with the horizontal and vertical deflecting elements of tube 57. The horizontal channel includes a filter 52 coupled to the output circuit of unit 51 and having connected in cascade therewith a limiter 53, an amplitude modulator 54, a frequency-modulation detector 55, and a horizontal-deflection amplifier 56. Similarly, the vertical channel is comprised of a filter 58 coupled to the output circuit of unit 51 and having connected in cascade therewith a limiter 59, an amplitude modulator 60, a frequency-modulation detector 61, and a vertical-deflection amplifier 62. Filters 52 and 58 are individually designed to select received frequency-modulated control signals having the carrier frequencies $f_1$ and $f_2$, respectively.

While the elements of the described deflection channels may be of any well-known design and construction, a preferred circuit arrangement for detectors 55 and 61 is illustrated in Fig. 3. As shown, each such detector comprises a pair of diode rectifiers 101, 102 coupled, respectively, to tuned circuits 103, 104 of a discriminator network to which a frequency-modulated signal may be applied by way of an inductively-coupled tuned circuit 105. Preferably, circuits 103 and 104 are tuned to frequencies equally displaced above and below the mean carrier frequency of the applied signal. Output circuits 107 and 108 are provided for rectifiers 101 and 102, respectively, and a voltage divider including resistors 109 and 110 coupled to the output circuits and having a grounded common terminal permit output voltages of opposite polarity to be obtained at terminals a and b. The detector is arranged to provide output unidirectional signals of opposite polarities for a purpose to be described hereinafter.

Also, as previously indicated, the arrangement of Fig. 2 includes means for utilizing certain others of the control signals for causing the line-tracing means to trace a second line at a frequency which is related to the frequency of rotation of the antenna directive pattern by an integer greater than unity. Such means comprise horizontal and vertical deflection channels coupled, respectively, with the horizontal and vertical deflecting elements of tube 63. The horizontal channel is provided by units 52'—56' connected in cascade and individually corresponding to units 52—56, respectively. Similarly, the vertical channel is provided by units 58'—62' which individually correspond to units 58—62, respectively. Filters 52' and 58' are individually designed to select the frequency modulated control signals having carrier frequencies $f_3$ and $f_4$, respectively, for utilization in the deflection channels associated with tube 63.

The received phase-modulated carrier signal and reference-signal components are utilized in an arrangement included in the line-tracing means for deriving the aforementioned marker signals. Except for the design of the phase-modulation detector, this arrangement is generally similar to the receiver portion of the phase-modulation system described in copending application Serial No. 503,071 of Bernard D. Loughlin, now Patent 2,403,385, issued July 16, 1946, referred to above. As illustrated, this arrangement includes filters 64, 65 and 66 connected with the amplifier and equalizer 51 for individually separating the phase-modulated carrier signal and each of the above-mentioned reference-signal components. Filters 64 and 65 are designed to have pass bands with mean frequencies corresponding to individual ones of the reference-signal components and sufficiently wide to pass the band of amplitude-modulation components associated with each such reference-signal component. The pass band of filter 66 has a mean frequency corresponding to that of the carrier component of the phase-modulated signal and is sufficiently wide to pass the band of modulation components associated therewith. A modulator or mixer 67 is coupled to the output circuits of filters 64 and 65 for the purpose of effectively combining the separated reference-signal components. The output circuit of mixer 67 is designed to select the upper side-band modulation component which comprises a phase-reference carrier harmonically related to the carrier signal generated in oscillation generator 40 of signal generator 46 (Fig. 1) and, thus, also harmonically related to the carrier component of the received phase-modulated carrier signal. A frequency converter or multiplier 68 coupled to the output circuit of filter 66 is provided for doubling the frequency of the received phase-modulated carrier signal to facilitate comparing the phase-reference carrier signal obtained in mixer 67 therewith. The signal outputs of units 67 and 68 are utilized in a phase-modulation detector, indicated generally as 95, having input circuits individually coupled thereto.

It is preferred that phase-modulation detector 95 be similar to detector arrangement 77 of the above-mentioned Loughlin application Serial No. 503,070. Such construction is illustrated in the drawings where detector 95 is represented as comprising a pulse detector 69 having one input circuit coupled to mixer 67 and a second input circuit coupled to frequency multipliers 68. Frequency multiplier 72 and 73 are included in detector arrangement 95, being coupled in cascade to the output circuit of mixer 67 for the purpose of multiplying the frequency of the signal output thereof successively by the factors 3 and 5, respectively. Additional frequency multipliers 72' and 73' are included in arrangement 95 and are coupled in cascade to the output circuit of multiplier 68 for similarly multiplying the frequency of the signal output thereof. Further, arrangement 95 includes pulse detectors 70 and 71. Detector 70 has one input circuit coupled to frequency multiplier 68 and another input circuit coupled to frequency multiplier 72, while the input circuits of detector 71 are individually coupled to frequency multipliers 73 and 73'. As will be apparent hereinafter, the signal output of each of pulse detectors 69—71, inclusive comprises a succession of marker signals individually corresponding to different predetermined positions of antenna system 20, 21.

The marker signals derived in the detectors of unit 95 control the beam of cathode-ray tube 63 to provide scale divisions on the screen thereof which correspond to the aforesaid predetermined positions of the antenna system 20, 21. This is accomplished by a first means which is responsive to a first succession of marker signals for shifting the line traced by the beam of tube 63 in accordance therewith to produce major scale divisions and a second means which is responsive to a second succession of marker signals for modulating the intensity of the beam in accordance therewith to produce minor scale divisions.

The first aforesaid means includes a modulator 74 having one input circuit to which high-frequency oscillations are supplied from an oscillator 75 and a second input circuit to which a first succession of marker signals is applied, this succession of signals comprising the combined signal outputs of pulse detectors 69 and 70. The oscillations from oscillator 75 have a frequency which is high with reference to the repetition frequency of the marker signals applied to modulator 74. The signal output of modulator 74 is applied to a voltage amplifier 76 through which the second anode voltage is supplied to tube 63 from a high-voltage power supply 77.

The means for modulating the intensity of the beam of tube 63 to provide minor scale divisions comprises the control electrode of the tube to which a second succession of marker signals is applied. This succession of signals is obtained directly from the output circuit of pulse detector 71 and is applied to the control electrode by way of a keying amplifier 78 and amplifier 79.

In order to obtain bearing indications from the direction finder, the line-tracing arrangement also includes means responsive to the amplitudes of signals picked up during the rotation of the antenna directive pattern for shifting the first line traced by the line-tracing means in accordance therewith to trace the antenna directive pattern with reference to the direction of reception of each received signal. This means comprises a detector 80 coupled to the output circuit of filter 64 for deriving the modulation components of the reference-signal component selected by this filter. These modulation components represent the amplitude variations of signals picked up during the rotation of antenna system 20, 21 and are supplied to modulators 54 and 60 included in the horizontal and vertical deflection channels, respectively, of tube 57 for the purpose of amplitude-modulating the frequency-modulated control signals translated in these channels.

An accurate indication of the bearing of a particular radiant-energy signal is obtained in the direction finder by tracing on the screen tube 63 at least a part of the antenna directive pattern with reference to the direction of reception of such particular signal. This is achieved through means responsive only to the amplitude of signals picked up within a predetermined fractional portion of the antenna system azimuthal rotation for shifting the second line traced by the line-tracing means. In particular, this means shifts the line traced by the beam of cathode-ray tube 63 and comprises additional detectors 81, 82 which are individually coupled to filters 64 and 65, respectively, and a control arrangement described hereinafter.

Detectors 81 and 82 may be identical in construction and are arranged to provide an output signal of controllable amplitude. A preferred circuit arrangement therefor is illustrated in Fig. 4 where it will be seen that each detector includes a diode rectifier 115 to which an amplitude-modulated signal may be applied by way of a transformer 116, 117, the primary winding 116 thereof being coupled with the filter 64 or 65 associated with the particular detector. The load circuit of the detector includes a resistor 118 by-passed by a condenser 119 in conventional manner. A repeater 120 coupled to the load circuit of rectifier 115 translates an output signal therefrom to an output terminal c provided for the detector arrangement. Repeater 120 is normally blocked or biased to cutoff by a holding potential applied to its cathode through a resistor 121 coupled to the space current supply, indicated +B, of the repeater. The output terminal c, being coupled to a cathode load 122 of the repeater, produces an output signal of the same polarity as that applied to the input circuit.

The amplitude of the output signals obtained at terminal c is controllable through a circuit arrangement which applies a control effect of positive polarity and adjustable magnitude to the control electrode of repeater 120. As shown, this circuit arrangement includes a voltage-divider resistor 123 connected in circuit with a suitable source of unidirectional potential, indicated +B. Vacuum tube 124 is an electronic device in shunt relation with resistor 123 for effectively short-circuiting the resistor, thereby to remove the control potential supplied from resistor 123 to the circuit of repeater 120. Vacuum tube 124 is normally biased to cutoff but may be rendered conductive for the purpose of short-circuiting resistor 123 in response to a control potential applied to its input terminal d from a further control arrangement presently to be described.

The control arrangement of Fig. 2 which derives a control effect for application to terminals d of the aforedescribed detectors comprises a block-out control 91 and square-wave limiter 92. The block-out control is a manually adjustable switch having four terminals individually coupled to output terminals a and b of detectors 55 and 61 included in the deflection channels of tube 57. In the illustrated embodiment, the switch has a single blade or switch arm 126 adapted selectively to engage one of the four input terminals. Switch arm 126 is coupled to the input circuit of square-wave limiter 92 for supplying thereto the signal obtained at the selected input terminal. Unit 92 may comprise any conventional amplifier arrangement adjusted for symmetrically limiting an applied signal, thereby to shape the signal into one having a substantially rectangular wave form. For example, the arrangement may be as indicated at 15 in United States Letters Patent No. 2,271,203, granted to Jasper J. Okrent on January 27, 1942. The signal of rectangular wave form obtained in square-wave limiter 92 is applied to terminals d of each detector 81, 82 for selectively causing each such detector to respond only to the amplitude of signals picked up within a predetermined fractional portion of the rotation of antenna system 20, 21.

The signal outputs obtained from detectors 81 and 82 under the control of the described control arrangement are combined and supplied to the input circuit of an additional square-wave limiter 83 where the applied signal is formed into a control pulse of substantially rectangular wave form. The limiter includes conventional circuit arrangements for applying the developed control pulse with opposite polarity to a pair of output terminals e and g hereinafter referred to, respectively, as "the positive-pulse terminal" and "the negative-pulse terminal."

The control pulses developed in unit 83 perform several control functions in connection with the line-tracing arrangement under consideration. For example, these pulses control the application of the signal outputs of detectors 81, 82 to modulators 54', 60' included in the deflection channels of tube 63. To this end, the positive-pulse terminal of unit 83 is coupled to a keying amplifier 84 which delivers the combined signal output of units 81, 82 to modulators 54' and 60'. The keying amplifier may be a conventional amplifier biased to cutoff in the absence of an applied control pulse of positive polarity. Modulators 54' and 60' amplitude-modulate the frequency-modulated signals translated through the horizontal and vertical deflection channels, respectively, of tube 63 in accordance with the output signals of detectors 81, 82.

A voltage supply 97 is also coupled to the positive-pulse terminal of unit 83 for applying a unidirectional potential of predetermined magnitude to modulators 54' and 60' only during intervals when there is no signal output derived in the circuits of detectors 81 and 82. This arrangement may be similar to that shown in Fig. 4, comprising a voltage divider 123 from which the unidirectional potential is derived and a control tube 124 for effectively suppressing this potential when an output signal from detectors 81 and 82 causes a control pulse to be applied to unit 97 from square-wave limiter 83.

In order to produce clear direction-finder patterns on the screen of tube 63, it is desirable to disable the described marker system during intervals when the beam of this tube is tracing a directive pattern. This is accomplished by means, comprising unit 83, which derives a control effect from the direction-finder signal output of detectors 81, 82, as hereinbefore described. This means also comprises oscillation generator 75 coupled to the negative-pulse terminal of unit 83 and keying amplifier 78 similarly coupled to unit 83, each of which is rendered inoperative in response to the control effect provided by unit 83.

There is also associated with tube 63 an arrangement for producing a pair of overlapping direction-finder patterns the intersections of which with reference to the scale divisions provided on the screen thereof sharply indicate the bearing of a particular signal. This arrangement comprises means for cyclically displacing the line traced by the beam of tube 63 at a frequency which is high with reference to the frequency at which the line is traced. This means is, preferably, generally similar to the line-displacing arrangement particularly described in copending application Serial No. 503,073, filed concurrently herewith in the name of James F. Craib and assigned to the same assignee as the present invention. In the drawings, the arrangement is indicated as 87 and comprises a first winding disposed about the neck portion of tube 63 for cyclically displacing the beam thereof. This winding is excited by a high-frequency sine-wave oscillation generator 88 through a power amplifier 89. A second winding is included in unit 87, being inductively coupled to the first winding thereof to supply induced oscillations to a full-wave rectifier and limiter 96, as indicated by connection 90. Unit 96, through rectification of these oscillations, produces a positive control voltage comprising pulses having a frequency twice that of the rectified oscillations. This control voltage is applied through amplifier 79 to the control electrode of tube 63. Additionally, oscillation generator 88 is coupled to the positive-pulse terminal of unit 83 to provide means for energizing the described beam-displacing arrangement only during intervals when the beam of tube 63 is controlled to trace a direction-finder pattern.

There is also included in the arrangement of Fig. 2 a pair of transient block-out units 85 and 86 coupled, respectively, to the negative and positive-pulse terminals of unit 83, such units being provided to supply block-out voltages for suppressing the beam of tube 63 during transient periods which immediately precede and follow the tracing of each directive pattern. The circuits of units 85 and 86 are generally similar and correspond to that of a conventional keyed multivibrator. A suitable circuit arrangement is illustrated in Fig. 5 where it will be apparent that each block-out unit comprises a pair of triode vacuum tubes 130 and 131. The anode of tube 130 is directly connected to the control electrode of tube 131, while the anode of tube 131 is coupled through condenser 135 to the control electrode of tube 130. A differentiating circuit, comprising a series condenser 132 and shunt resistor 133, is provided in the input circuit of tube 130. A holding voltage obtained from a bleeder network including resistor 134 causes tube 131 normally to be biased to cutoff, while tube 130 is normally conductive. An input terminal j is provided for the input circuit of the block-out arrangement to receive a control pulse, hereinafter described, which causes an output pulse to be obtained at an output terminal k. The output pulses developed in the transient block-out units 85, 86 are applied through amplifier 79 to the control electrode of tube 63 with such polarity that the beam of the tube is suppressed during the aforesaid transient periods.

The direction finder has a further provision which distinguishes that portion of the line traced by the beam of cathode-ray tube 57 which is also traced by the beam of cathode-ray tube 63. This is accomplished through a further keying amplifier 93 which receives the succession of marker signals supplied by pulse detectors 69, 70 and applies such marker signals to the control electrode of tube 57 to bias the tube to cutoff periodically at a frequency corresponding to the repetition rate of the applied signals. Amplifier 93 is coupled to the negative-pulse terminal of unit 83 and is thus disabled during intervals when tube 63 is tracing a directive pattern.

In discussing the operation of the described direction finder, only brief mention will be made of the operation of those components which are similar in construction to identified portions of the aforementioned copending applications. The construction an operating details of such components may be obtained from the identified copending applications. As an aid in understanding the description which follows, direction arrows are provided on the conductors of Figs. 1 and 2 to indicate the direction of signal translation.

Assume for the moment that no signals are intercepted by antenna system 20, 21 during its rotation through an azimuth of 360 degrees. For this condition, no output signal is derived in receiver 25. However, this rotation of the antenna system causes inductive-coupling devices 30 and 31 to frequency-modulate the output signals of oscillation generators 35 and 36, respectively. Preferably, units 30 and 31 are so adjusted that the operating frequencies of oscillation generators 35 and 36 vary in response to antenna rotation, as indicated by curves A and B, respectively, of Fig. 6a. It will be apparent from these curves that the frequency of each generator varies in accordance with a sine function of antenna rotation and that the modulation of one generator has a 90-degree phase displacement with reference to the modulation of the other. Units 30' and 31' modulate the output signals of oscillators 35' and respectively, in a similar manner but at a frequency corresponding to four times that of the antenna rotation. At the same time, modulator 37 phase-modulates the signal applied thereto from oscillation generator 40 in accordance with the rotation of antenna system 20, 21, thereby to develop a phase-modulated signal. This signal comprises the aforementioned comparative oscillations having a phase relation with reference to the oscillations produced in oscillator 40 which continuously varies at a rate corresponding to twelve times the antenna rotation. Also, the carrier signal from oscillation generator 40 is amplitude-modulated in balanced modulator 41 with a modulating signal having a frequency $f_5$ to produce phase-reference signal components.

Figure 7:
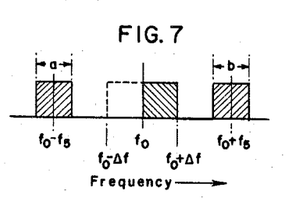

The principal factors in determining the value of the modulating frequency $f_5$ are represented in the frequency spectrum of Fig. 7. In this figure, frequency component $f_0$ represents the carrier signal supplied by oscillation generator 40. The band of frequencies associated therewith, having the limiting frequencies $f_0$ and $f_0+\Delta f$, represents the band of phase-modulation components produced in modulator 37 as antenna system 20, 21 is brought from a condition of rest to its maximum frequency of rotation, for one direction of antenna rotation. The frequency band illustrated by broken-line construction indicates the corresponding modulation components produced under the same conditions but assuming the direction of antenna rotation to be reversed. The frequency components indicated $f_0+f_5$ and $f_0-f_5$ represent the reference-signal components produced in balanced modulator 41. The frequency bands $a$ and $b$ associated with the reference-signal components are considered hereinafter. It will be noted from Fig. 7 that the modulating frequency $f_5$ is chosen so that the developed reference-signal components $f_0+f_5$ and $f_0-f_5$ are spaced in the frequency spectrum from the carrier signal $f_0$ by equal and opposite increments of such magnitude that the band of phase-modulation components $f_0\pm\Delta f$ is located therebetween.

Each of the aforedescribed signals produced in signal generator 46 is amplified in amplifier 44 and applied to channel 47 for translation to the remote indicating arrangement. For the assumed operating condition, when there is no output signal derived in receiver 25, modulator 43 serves merely as an amplifier for the reference-signal components.

At the line-tracing arrangement (Fig. 2), the received signals are selectively amplified in unit 51 and delivered to the several filters associated therewith. Filters 52 and 53 select the frequency-modulated signals having carrier frequencies $f_1$ and $f_2$, respectively. For the assumed operating conditions, modulators 54 and 60 are biased nearly to cutoff and function merely as low-gain amplifiers and the selected signals are translated in the horizontal and vertical deflection channels of tube 57 in a conventional manner. Detectors 55 and 61 derive deflection signals therefrom for tube 57 which have sinusoidal amplitude variations and a time-phase displacement of 90 degrees. These signals cause the beam of the tube to trace a circular path in synchronism with the antenna rotation. Since modulators 54 and 60 are biased nearly to cutoff for the assumed conditions, the traced circular path has an exceedingly small radius and may appear on the screen of tube 57 as a dot. In like manner, the frequency-modulated signals having carrier frequencies $f_3$ and $f_4$ are utilized, respectively, in the horizontal and vertical deflection channels of tube 63 and cause the beam thereof to trace a circular path at a frequency corresponding to four times that of the antenna rotation. However, the circular path traced on the screen of tube 63 has a large radius and appears near the edge of the screen. This results from the unidirectional potential applied to modulators 54' and 60' from unit 97 for the assumed conditions, i. e., with no signal output derived in detectors 81 and 82.

The reference-signal components $f_0-f_5$ and $f_0+f_5$ are separated by filters 64 and 65 and modulated in mixer 67 to produce a reference-phase carrier signal corresponding to the second harmonic of the signal output from oscillation generator 40 in signal generator 46 and, therefore, also corresponding to the second harmonic of the carrier component of the received phase-modulated carrier signal. Also, the received phase-modulated carrier signal selected by filter 66 is doubled in frequency by multiplier 68. The output signals thus derived in units 67 and 68 are applied to detector 95 where they are utilized to derive desired marker signals for application to cathode-ray tube 63.

While the oscillations of the original signals from oscillation generator 40 and modulator 37 continuously vary in phase at a rate corresponding to twelve times that of the antenna rotation, the oscillations of the corresponding signals derived in units 67 and 68, respectively, vary in phase at twice that rate, or at twenty-four times the antenna rotation. It will be seen, therefore, that the oscillations from units 67 and 68 have a predetermined phase relation, for example, the oscillations will have substantially identical phase at intervals corresponding to every 15 degrees of antenna rotation. Pulse detector 69 of unit 95 to which these oscillations are directly applied from units 67 and 68 is effective to derive a single marker signal during each interval the applied oscillations have such predetermined phase relation. Hence, a succession of marker signals is derived in this detector, which signals individually represent different predetermined positions of the antenna directive pattern having a spacing of 15 rotational degrees.

In like manner, pulse detector 70 of unit 95 utilizes the oscillations from frequency multiplier 72 and those from frequency multiplier 68 to derive a single marker signal at each interval when such oscillations have substantially identical phase. Since the frequency of the oscillations from mixer 67 have been multiplied by three in multiplier 72, the succession of marker signals derived in this detector has a repetition frequency which is three times that of the marker signals derived in detector 69. In other words, the signals from detector 70 represent different predetermined positions of the antenna directive pattern having a 5-degree spacing.

Still another succession of marker signals is obtained from pulse detector 71 of unit 95. Inasmuch as the oscillations applied to this detector have been multiplied in frequency fifteen times, the derived signals individually represent different predetermined positions of the antenna directive pattern having a 1-degree spacing.

The marker signals from detectors 69 and 70 are combined and applied to modulator 74 to modulate the second anode voltage of tube 63. Such modulation of the second anode voltage modulates the electron velocity of the beam of the tube, permitting the deflecting elements to deflect the beam radially at a rapid rate to produce major scale divisions on the screen. These scale divisions individually represent different predetermined positions of the antenna directive pattern having a 5-degree spacing. A maximum radial deflection of the beam is obtained at intervals corresponding to every 15 degrees of antenna rotation by reason of the fact that the combined output signals of detectors 69 and 70 have peak values at such intervals. On the other hand, the output signal of detector 71 is applied to the control electrode of tube 63 to energize the beam thereof periodically and produce minor scale divisions corresponding to every one degree of antenna rotation. Since the repetition frequencies of the signal outputs of units 69, 70 and 71 are integrally related, unit 71 causes the beam of tube 63 to be energized at intervals when the beam is deflected radially to produce major scale divisions. The resulting scale provided on the screen is indicated in Fig. 2.

In brief, when no signals are intercepted during the rotation of antenna system 20, 21 the beam of tube 57 is controlled to trace a circular path of extremely small radius or a spot in synchronism with the antenna rotation. At the same time the beam of tube 63 is controlled to trace a circular path near the periphery of its screen at a frequency corresponding to four times that of the antenna rotation. However, the beam of tube 63 is further controlled to modulate this circular path, thereby to provide scale divisions on the screen which correspond to different predetermined positions of the antenna directive pattern.

Let it be assumed, now, that antenna system 20, 21 intercepts two radiant-energy signals in its rotation, one having an azimuth of 30 degrees and the other an azimuth of 240 degrees. For this operating condition, an output signal is obtained from receiver 25 having amplitude variations which represent the antenna directive pattern with reference to the direction of reception, or bearing, of each received signal. The operation of signal generator 46 is substantially as described, except that the reference-signal components from unit 41 are now amplitude-modulated in unit 43 with the signal output of receiver 25. The output signal of this receiver is essentially a low-frequency signal having components corresponding to the frequency of antenna rotation (about 100 revolutions per minute) and harmonics thereof. The resulting bands of modulation components associated with each reference-signal component are designated $a$ and $b$ in the frequency spectrum of Fig. 7. It will be noted that the modulating frequency $f_5$ utilized in deriving the reference-signal components is chosen of such value that the bands of amplitude-modulation components $a, b$ are so spaced in the frequency spectrum that the bands of phase-modulation components $f_0 + \Delta f$ and $f_0 - \Delta f$ produced in unit 37 are located therebetween. This is a necessary frequency relationship to facilitate separation of the phase-modulation signal and the amplitude-modulated reference-signal components which are translated to the remote indicator over the single channel 47.

Figure 8:
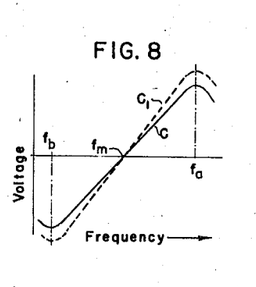

At the remote line-tracing arrangement (Fig. 2), detector 80 derives the amplitude-modulation components of the reference-signal component selected by filter 64. These modulation components represent the signal output of receiver 25 for the assumed operating condition and are utilized in modulators 54 and 60 to amplitude-modulate the signals translated in the horizontal and vertical channels, respectively, of tube 57. The effect of this amplitude modulation is illustrated graphically by the curves of Fig. 8 where the full-line curve C is the frequency-response characteristic of detectors 55 and 61 for signals of a given intensity or constant amplitude. With reference to the circuit diagram of the detectors in Fig. 3, the characteristic of Fig. 8 is effective at the terminal $a$ and the frequencies $f_a$ and $f_b$ represent the peak-response frequencies of tuned circuits 103 and 104, respectively. For an applied signal of greater intensity, the frequency-response characteristic may be as represented by broken-line curve $C_1$. It will be seen that the slope of the response characteristic varies with the amplitude of the applied signal and, hence, the amplitude of the signal output from the detector varies with amplitude variations of the applied frequency-modulated signals. Thus, it will be apparent that modulation of the signals translated in the horizontal and vertical deflection channels of tube 57 with the signal output of detector 80 modifies the deflection signals of the tube in accordance therewith. The modified deflection signals cause the beam of tube 57 to trace on the screen thereof the antenna directive pattern with reference to the direction of reception of each received signal. The resulting pattern is indicated in Fig. 2. A compass scale associated with the screen of the tube permits an approximate bearing indication of each received signal to be obtained.

Let it be further assumed that an accurate bearing indication is desired of the received signal having an azimuth of 30 degrees. Such indication may be obtained by controlling the beam of tube 63 to trace at least a portion of the antenna directive pattern with reference to the direction of reception of this particular signal. To accomplish this result, block-out control 91 is adjusted to apply a control effect to detectors 81 and 82 for rendering such detectors responsive only to the amplitude of a signal picked up within that fractional portion of the antenna rotation which corresponds to its rotation from west to east, assuming a clockwise direction of motion.

Figure 6A:
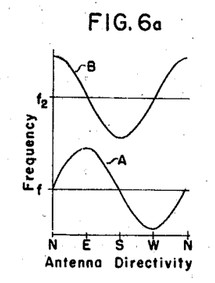
Figure 6B:
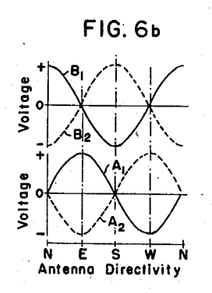
Figure 6C:
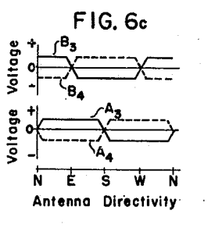

In considering the operation of block-out control 91 and square-wave limiter 92, reference is made to the curves of Figs. 6a, 6b and 6c. As previously indicated, curves A and B of Fig. 6a represent the frequency variations of the signals translated in the horizontal and vertical channels of tube 57 with the rotation of the antenna system. In Fig. 6b curves $A_1$ and $A_2$ represent the signal outputs obtained at terminals $a$ and $b$, respectively, of detector 55 in response to the signal translated thereby. Curves indicated $B_1$ and $B_2$ represent the corresponding output signals obtained at like terminals of detector 61. These signals are applied to individual ones of the input terminals of block-out control 91 for selection by its switch arm 126. Unit 92, by symmetrically limiting the signal selected by switch arm 126, produces an alternating control potential having a substantially rectangular wave form. Thus, as represented by the curves of Fig. 6c, the control arrangement may produce any of four control signals indicated by the curves $A_3$, $A_4$, $B_3$ and $B_4$ corresponding, respectively, to applied signals $A_1$, $A_2$, $B_1$ and $B_2$. It will be noted that in each case the alternating control signal has a fundamental frequency corresponding to that of the antenna rotation. Viewing the curves in the order $A_3$, $B_4$, $A_4$ and $B_3$, it will be seen that the four control signals available through the selective operation of the control arrangement have a relative phase displacement of 90 degrees. To make detectors 81, 82 responsive to the signals picked up by the antenna system as it rotates from west to east, switch arm 126 of unit 91 is positioned, as indicated in the drawing, on terminal W—E which selects control signal $B_4$ for application to terminals $d$ of the detectors.

Figure 9:
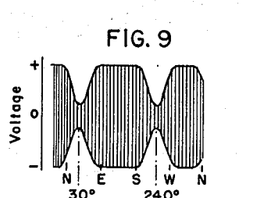
Figure 10A:
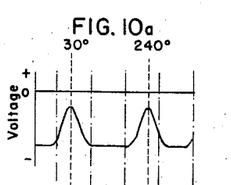
Figure 10B:
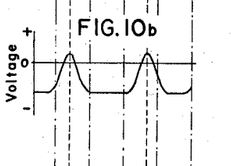
Figure 10C:
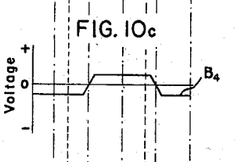
Figure 10D:
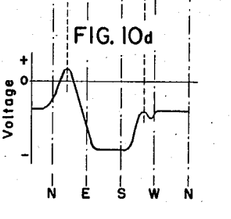

The operation of detectors 81, 82 will now be considered with reference to the curves of Figs. 9 and 10a through 10d. The curve of Fig. 9 represents the envelope of the signal applied to the detectors from filters 64 and 65, respectively, for the assumed operating conditions. It will be apparent upon inspection that the direction-finder information (the signal output of receiver 25) is translated to the indicator arrangement of Fig. 2 as inward modulation of the reference-signal components $f_0+f_5$ and $f_0-f_5$. Neglecting for a moment the control effect applied to the repeater circuits of the detectors from resistors 123, it will be seen that the signals derived in their load circuits by rectification of the applied amplitude-modulated reference-signal components are represented by the curve of Fig. 10a. Inasmuch as the detected signals have a negative polarity and repeaters 120 are normally biased to cutoff, no output signals are obtained at terminals $c$ of the detectors. However, by adjusting resistors 123, the peaks of the detected signals may be caused to have a positive polarity, as indicated by the curve of Fig. 10b, and thus may be translated through repeaters 120 to output terminals $c$. With the selected control signal $B_4$ of Fig. 10c applied from units 91 and 92 to terminals $d$ of the detectors, their response is as shown by the curve of Fig. 10d. It will be seen that an output signal is obtained in response to the received signal having a bearing of 30 degrees, whereas the detectors are effectively nonresponsive to the signal having a bearing of 240 degrees. This results from the fact that during the rotation of the antenna system from east to west the positive half-cycle of the control signal applied to terminals $d$ of the detectors causes tubes 124 effectively to short-circuit resistors 123 and thus remove the control effect applied therefrom to the repeater circuits of the detectors. The precise adjustment of resistors 123 is described hereinafter in connection with the direction-finder pattern produced on the screen of tube 63.

Figure 11A:
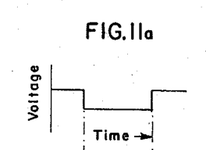
Figure 11B:
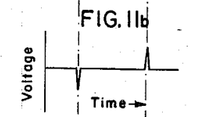
Figure 11C:
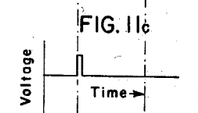

The output signals thus obtained from detectors 81 and 82 are combined and applied to unit 83 to be formed into a control pulse of substantially rectangular wave form. The negative control pulse produced at terminal $g$ of unit 83 is represented on an expanded time scale in Fig. 11a. This pulse is differentiated in the input circuit of block-out device 85, thereby to derive negative and positive pulses from the leading and trailing edges, respectively, as shown in Fig. 11b. The derived negative pulse biases tube 130 of the multivibrator arrangement 85 to cutoff, thereby rendering tube 131 conductive. This tube conducts for one time cycle, determined by the time constant of condenser 135 and resistor 133, to produce at the output terminal $k$ of the block-out arrangement a pulse indicated by the curve of Fig. 11c having a predetermined duration. This block-out pulse is applied through amplifier 79 to the control electrode of tube 63 to suppress the beam thereof during the transient period which immediately precedes the tracing of a direction-finder pattern.

The positive control pulse from terminal $e$ of unit 83 is applied to unit 97 and removes the above-mentioned unidirectional potential from modulators 54' and 60' in a manner similar to the described operation of tubes 124 which removes a similar unidirectional potential from the repeater circuits of detectors 81 and 82. The positive control pulse also energizes keying amplifier 84, thereby to translate the combined signal output from detectors 81 and 82 through amplifier 84 to modulators 54' and 60'. These modulators operate in a manner similar to that described in connection with units 54 and 60 to control the beam of the cathode-ray tube 63 to trace a direction-finder pattern in accordance with the output signal of detectors 81 and 82. The positive control pulse of unit 83 also energizes the beam-displacement arrangement through its control of oscillator 88. Winding 87 of this arrangement displaces the beam of tube 63 angularly at a high rate during the interval when the beam is controlled to trace a direction-finder pattern. Control pulses from rectifier 96 energize the beam at each instant when the beam has its maximum angular displacement, thereby to produce intersecting patterns on the screen of tube 63 whose intersections with reference to the scale divisions on the screen thereof sharply determine the direction of reception or bearing of the particular signal. Accurate bearing indications are readily obtained by properly adjusting the taps on resistors 123 associated with the circuits of detectors 81 and 82. The adjustments should be such that the response of the detectors is limited to that portion of the signal output of receiver 25 during the selected fractional rotation of the antenna system which produces patterns on the tube 63 intersecting at an angle of between 45 and 90 degrees. In general, it will be satisfactory to adjust the control resistors 123 so as to cause the detectors to respond to that part of the signal output from receiver 25 which corresponds to the top twenty-five per cent of the antenna directive pattern.

Figure 12A:
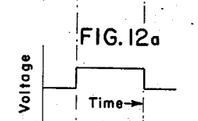
Figure 12B:
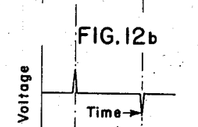
Figure 12C:
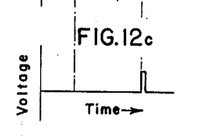

When the selected portion of the antenna directive pattern has been traced, transient block-out 86 produces a block-out pulse for again suppressing the beam of tube 63. The operation of this unit is clearly represented by the curves of Figs. 12a to 12c, inclusive, and is generally similar to that already described in connection with unit 85.

During the intervals when the beam of tube 63 is controlled to trace a direction-finder pattern, unit 83 through its association with keying amplifier 78 and oscillator 75 disables the marker system. Further, unit 83 blocks keying amplifier 93 for such intervals so that the portion of the direction-finder pattern which is traced simultaneously by tubes 57 and 63 appears on the former in a full-line construction, whereas amplifier 93 causes all other portions of the pattern on tube 57 to have a broken-line construction. This feature facilitates correlating the patterns appearing on the screens of the two tubes. In the instant case, for example, it will be apparent upon inspection that the screen of the tube 63 represents the first quadrant of the screen of tube 57. Hence, the scale divisions on screen 63 for the assumed conditions represent the first 90 degrees of antenna rotation.

In brief, it will be seen that the beam of tube 57 is controlled to trace the antenna directive pattern with reference to the direction of reception of each signal intercepted by antenna system 20, 21 during its rotation. The beam of tube 63, however, is normally controlled to establish scale divisions on its screen except for that predetermined fractional portion of the antenna rotation when the antenna intercepts the particular signal whose bearing is to be determined accurately. During such predetermined fractional portion of the antenna rotation, the beam of tube 63 traces a selected portion of the antenna directive pattern with reference to the direction of reception of this particular signal and during such intervals the marker system is disabled. However, the persistence of the screen causes the directive pattern to be traced with reference to scale divisions previously established on the screen. It will be apparent that tube 63 produces an expanded or vernier representation of the selected portion of the antenna directive pattern and that this expanded representation permits extremely accurate bearing indications to be obtained.

Figure 13:
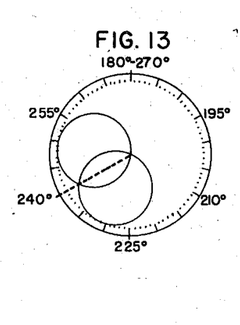

If an accurate bearing indication should be desired of the signal having a 240-degree azimuth, it is only necessary to adjust switch arm 126 of unit 91 to the position indicated E—W. This position of the control switch applies control signal $B_3$ of Fig. 6c to detectors 81, 82, rendering the detectors responsive only to the amplitude variations of the desired signal. Again, the taps on resistors 123 of the detectors are to be adjusted to produce sharply intersecting patterns on the screen of tube 63. The bearing indication that would be obtained is as represented by the curves of Fig. 13. It will be apparent that for this condition the scale on tube 63 represents the rotation of the antenna system from 180 to 270 degrees.

In the described embodiment, units 91 and 92 produce a control effect capable of suppressing the operation of detectors 81, 82 for approximately 180 degrees of antenna rotation. While such an arrangement is satisfactory for many installations, it may be desirable for other applications to suppress the operation of the detectors for a longer portion of the antenna rotation. For example, with the beam of tube 63 rotating at four times the antenna rotation, it may be desirable to have the detectors responsive only to the amplitudes of signals picked up within a predetermined quadrant of antenna rotation. Many different arrangements may be utilized to provide this operation, a simple one being illustrated in Fig. 14. This arrangement comprises a two-section switch which has four terminals 150 (only two of which appear in the drawings) having a circular arrangement in an insulating mounting strip 151. The terminals are engaged on one side of the mounting strip by a brush 152 secured to a shaft 153 which may be rotated by means of a control dial 154. The terminals are engaged on the opposite side of the mounting strip by a second brush 155 carried by a bushing 156 rotatable about shaft 153. A gear 157 is also secured to bushing 156 and is engaged by a second gear 158 carried by a stub shaft 159 rotatably supported in a mounting plate 160. A control knob 161 also secured to shaft 159 permits brush 155 to be positioned upon a selected one of terminals 150. Brushes 152 and 155 are suitably connected to an output terminal 164 of the switch arrangement by way of leads 162 and 163.

Figure 15:
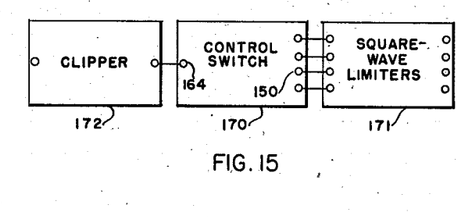

The described control switch may be utilized in the arrangement of Fig. 2 in place of units 91 and 92. However, in making the substitution, square-wave limiters 171 and a clipper 172 are to be coupled to the control switch, as indicated in Fig. 15 where the switch is designated schematically at 170. More particularly, unit 171 includes four square-wave limiting stages individually coupled to one of the input terminals 150 of the switch and clipper 172 is coupled to the output terminal 164 of the switch. The input terminals of unit 171 are to be individually connected to one output terminal $a$ or $b$ of detectors 55 and 61; the output terminal of clipper 172 is to be connected to control-pulse input terminals $d$ of detectors 81 and 82; and control tubes 124 of detectors 81 and 82 are to be normally conductive, short-circuiting the associated voltage divider 123.

Figure 16A:
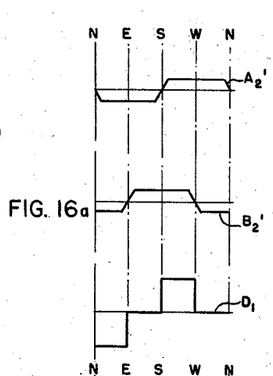
Figure 16B:
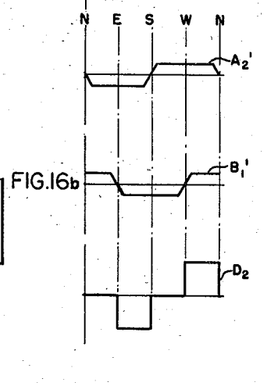
Figure 16C:
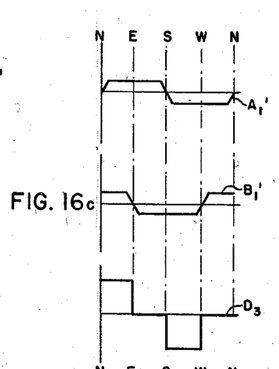
Figure 16D:
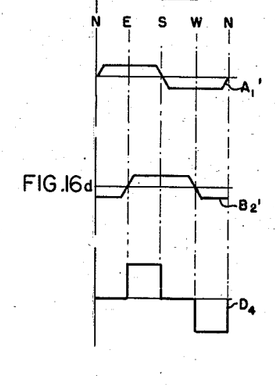

The operation of the modified control arrangement, when coupled to the line-tracing arrangement of Fig. 2 as described above, is shown by the curves of Figs. 16a to 16d, inclusive. In Fig. 16a, for example, the operation indicated results when one of brushes 152, 155 is positioned on that switch terminal which is connected with output terminal $b$ of detector 55, while the other is positioned on that switch terminal which connects with terminal $b$ of detector 61. With the brushes in the positions indicated, the switch combines the signal outputs obtained from the identified terminals of detectors 55 and 61, after these signals have been shaped in unit 171 to have the wave forms represented, respectively, by curves $A_2'$ and $B_2'$, and supplies the combined signal to clipper 172. The signal thus applied to clipper 172 has the wave form of curve $D_1$ and by peak-limiting in unit 172, a negative control pulse is derived for application to terminals $d$ of detectors 81 and 82. It will be noted from curve $D_1$ that this control signal of negative polarity occurs during the first quarter of the antenna rotation and when applied to detectors 81 and 82, modified to have tubes 124 normally conductive, causes the detectors to respond to the amplitudes of signals picked up during this predetermined fractional portion of the antenna rotation. Corresponding curves of Figs. 16b, 16c and 16d show the output signals selected from detectors 55 and 61 by selectively positioning brushes 152 and 155 and the resulting negative control pulses derived in unit 172. It will be apparent that such control effects may be utilized to render the detectors 81, 82 responsive to any of the remaining quadrants of antenna rotation. By positioning both brushes on the same terminal of the switch arrangement, control effects may be obtained from unit 172 having wave forms represented by the curves of Fig. 6c. Thus, the described switching arrangement is flexible and affords a wide control over the response of detectors 81, 82.

Figure 14:
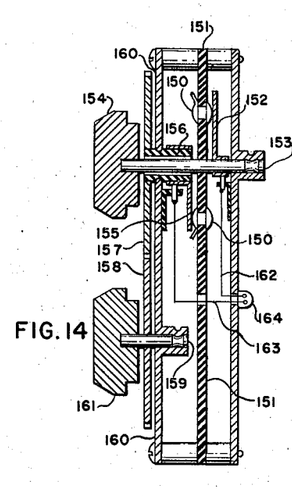

The modified control arrangement, including a switch of the type illustrated in Fig. 14, so controls detectors 81 and 82 that these detectors comprise means responsive only to the amplitudes of signals picked up within a predetermined quarter of the antenna azimuthal rotation for shifting the line traced by the beam of tube 63. In other words, this means is responsive to a fractional portion of the antenna rotation, which fraction has a value not substantially greater than the reciprocal of the integer relating the rotation of the antenna and the rotation of the beam of tube 63.

While in a preferred embodiment of the invention antenna system 20, 21 is rotated through an azimuth of 360 degrees, it will be apparent that, if desired, the antenna may be oscillated through a lesser azimuth. Also, the beam of cathode-ray device 63 need not necessarily be rotated at four times the frequency of the antenna rotation. For example, it may be desirable in certain installations to rotate the beam of this tube at a reduced speed.

Further, it will be understood that a direction finder in accordance with the invention may utilize a single cathode-ray line-tracing device. However, to obtain all of the advantages of the invention with such an arrangement, the beam of such device may be rotated in synchronism with the antenna system for a first interval in order to obtain a directive pattern representing the bearing of each signal intercepted during the rotation of the antenna system. Then, to derive an accurate bearing indication of a particular signal, the device may be operated for another predetermined interval in accordance with the described operation of tube 63.

It will also be understood that in place of antenna system 20, 21 a pick-up system may be utilized which is capable of receiving periodic sound or light signals and a phrase "a direction finder for determining the direction of reception of a particular radiant-energy signal" is intended to include such other applications. Additionally, the signal-translating channel 47 may, if desired, be a radio link instead of a conventional telephone chanel as described.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, and means responsive only to the amplitudes of signals picked up within a predetermined fractional portion of said azimuthal rotation for shifting the line traced by said line-tracing means in accordance therewith to trace at least a portion of said directive pattern.

2. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, and means responsive only to the amplitudes of signals picked up within a predetermined fractional portion of said azimuthal rotation which has a value not substantially greater than the reciprocal of said integer for shifting the line traced by said line-tracing means in accordance therewith to trace at least a portion of said directive pattern.

3. A direction finder for determining the direction of reception of a particular radiant-energy signal comprising, a pick-up system having a directive pattern, means for controlling said pick-up system to cause said directive pattern to rotate through a predetermined azimuth, a cathode-ray line-tracing device, means for controlling the cathode-ray beam of said device to trace a circular path at a frequency which is related to the frequency of rotation of said directive pattern by an integer greater than unity, and means responsive only to the amplitudes of signals picked up within a predetermined fractional portion of said azimuthal rotation for modulating the radius of said circular path in accordance therewith to trace at least a portion of said directive pattern.

4. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving a control effect during a predetermined fractional portion of said azimuthal rotation, means responsive to the amplitudes of signals picked up by said system during said rotation for shifting the line traced by said line-tracing means in accordance therewith, and means for utilizing said control effect to cause the line traced by asid line-tracing means to be shifted only in response to the amplitudes of signals picked up within said fractional portion of said rotation, thereby to trace at least a portion of said directive pattern.

5. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving a control effect in response to a predetermined fractional portion of said azimuthal rotation, means responsive to the amplitudes of signals picked up by said system during said rotation for shifting the line traced by said line-tracing means in accordance therewith, and means for utilizing said control effect to cause the line traced by said line-tracing means to be shifted only in response to the amplitudes of signals picked up within said fractional portion of said rotation, thereby to trace at least a portion of said directive pattern.

6. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving a control effect during a predetermined fractional portion of said azimuthal rotation, means responsive to the amplitudes of signals picked up by said system during said rotation for shifting the line traced by said line-tracing means in accordance therewith, and means for applying said control effect to said last-named means to cause the line traced by said line-tracing means to be shifted only in response to the amplitudes of signals picked up within said fractional portion of said rotation, thereby to trace at least a portion of said directive pattern.

7. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving an alternating control potential in synchronism with said rotation, means responsive to the amplitudes of signals picked up by said system during said rotation for shifting the line traced by said line-tracing means in accordance therewith, and means for utilizing a predetermined fractional portion of said control potential to cause the line traced by said line-tracing means to be shifted only in response to the amplitude of a signal picked up within a corresponding fractional portion of said azimuthal rotation, thereby to trace at least a portion of said directive pattern.

8. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means responsive only to the amplitude of a signal picked up within a predetermined fractional portion of said azimuthal rotation for shifting the line traced by said line-tracing means in accordance therewith to trace a selected portion of said directive pattern, and means for cyclically displacing the line traced by said line-tracing means at a frequency which is high with reference to the frequency at which said line is traced to produce intersecting lines sharply indicative of the direction of reception of said signal.

9. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means responsive only to the amplitude of a signal picked up within a predetermined fractional portion of said azimuthal rotation for shifting the line traced by said line-tracing means in accordance therewith to trace at least a portion of said directive pattern, means for limiting the response of said last-named means within said fractional portion of said rotation to cause said line-tracing means to trace a selected portion of said directive pattern, and means for cyclically displacing the line traced by said line-tracing means at a frequency which is high with reference to the frequency at which said line is traced to produce intersecting lines sharply indicative of the direction of reception of said signal.

10. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, detector means responsive only to the amplitude of a signal picked up within a predetermined fractional portion of said azimuthal rotation for shifting the line traced by said line-tracing means in accordance therewith to trace at least a portion of said directive pattern, means for applying a control potential to said detector means to limit the response of said detector means within said fractional portion of said rotation to cause said line-tracing means to trace a selected portion of said directive pattern, and means for cyclically displacing the line traced by said line-tracing means at a frequency which is high with reference to the frequency at which said line is traced to produce intersecting lines sharply indicative of the direction of reception of said signal.

11. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, detector means responsive only to the amplitude of a signal picked up within a predetermined fractional portion of said azimuthal rotation for shifting the line traced by said line-tracing means in accordance therewith to trace at least a portion of said directive pattern, means for applying a control bias to said detector means to limit the response of said detector means within said fractional portion of said rotation to cause said line-tracing means to trace a selected portion of said directive pattern, and means for cyclically displacing the line traced by said line-tracing means at a frequency which is high with reference to the frequency at which said line is traced to produce intersecting lines sharply indicative of the direction of reception of said signal.

12. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving a succession of marker signals individually representing different predetermined positions of said directive pattern, means for applying said marker signals to said line-tracing means to provide scale divisions corresponding to said predetermined positions, means responsive only to the amplitude of a signal picked up within a predetermined fractional portion of said azimuthal rotation for shifting the line traced by said line-tracing means in accordance therewith to trace at least a portion of said directive pattern with reference to said scale divisions, and means for rendering said line-tracing means unresponsive to said marker signals only during intervals when the line traced thereby is shifted to trace said directive pattern.

13. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving a succession of marker signals individually representing different predetermined positions of said directive pattern, means for applying said marker signals to said line-tracing means to provide scale divisions corresponding to said predetermined positions, means responsive only to the amplitude of a signal picked up within a predetermined fractional portion of said azimuthal rotation for shifting the line traced by said line-tracing means in accordance therewith to trace at least a portion of said directive pattern with reference to said scale divisions, and means responsive to said last-named means for rendering said line-tracing means unresponsive to said marker signals during intervals when the line traced thereby is shifted to trace said directive pattern.

14. A direction-finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a line at a frequency which is related to the frequency of rotation of said directive pattern by an integer greater than unity, means for deriving a succession of marker signals individually representing different predetermined positions of said directive pattern, means for applying said marker signals to said line-tracing means to provide scale divisions corresponding to said predetermined positions, means responsive only to the amplitude of a signal picked up within a predetermined fractional portion of said azimuthal rotation for shifting the line traced by said line-tracing means in accordance therewith to trace at least a portion of said directive pattern with reference to said scale divisions, means for cyclically displacing the line traced by said line-tracing means at a frequency which is high with reference to the frequency at which said line is traced to produce intersecting lines sharply indicative of the direction of reception of said signal, means for deriving a control effect from said signal picked up within said fractional portion of said rotation, and means for utilizing said control effect to energize said line-displacing means and to render said line-tracing means unresponsive to said marker signals during intervals when the line traced thereby is shifted to trace said directive pattern.

15. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a first line in synchronism with the rotation of said directive pattern, means for controlling said line-tracing means to trace a second line at a frequency which is related to the frequency of rotation of said directive pattern by an integer greater than unity, means responsive to the amplitudes of signals picked up during said azimuthal rotation for shifting said first line traced by said line-tracing means in accordance therewith to trace said directive pattern with reference to the direction of reception of each of said signals, and means responsive only to the amplitude of a signal picked up within a predetermined fractional portion of said azimuthal rotation for shifting said second line traced by said line-tracing means in accordance therewith to trace at least a portion of said directive pattern with reference to the direction of reception of said signal.

16. A direction finder for determining the direction of reception of a particular radiant-energy signal comprising, a pick-up system having a directive pattern, means for controlling said pick-up system to cause said directive pattern to rotate through a predetermined azimuth, line-tracing means including a first and a second line-tracing device, means for controlling said first device to trace a line in synchronism with the rotation of said directive pattern, means for controlling said second device to trace a line at a frequency which is related to the frequency of rotation of said directive pattern by an integer greater than unity, means responsive to the amplitudes of signals picked up during said azimuthal rotation for shifting the line traced by said first device in accordance therewith to trace said directive pattern with reference to the direction of reception of each of said signals, and means responsive only to the amplitude of a signal picked up within a predetermined fractional portion of said azimuthal rotation for shifting the line traced by said second device in accordance therewith to trace at least a portion of said directive pattern with reference to the direction of reception of said signal.

17. A direction finder for determining the direction of reception of a particular radiant-energy signal comprising, a pick-up system having a directive pattern, means for controlling said pick-up system to cause said directive pattern to rotate through a predetermined azimuth, cathode-ray line-tracing means including a first and a second line-tracing device, means for controlling the cathode-ray beam of said first device to trace a circular path in synchronism with the rotation of said directive pattern, means for controlling the cathode-ray beam of said second device to trace a circular path at a frequency which is related to the frequency of rotation of said directive pattern by an integer greater than unity, means responsive to the amplitudes of signals picked up during said azimuthal rotation for modulating the radius of the circular path traced by said first device in accordance therewith to trace said directive pattern with reference to the direction of reception of each of said signals, and means responsive only to the amplitude of a signal picked up within a predetermined fractional portion of said azimuthal rotation for modulating the radius of the circular path traced by said second device in accordance therewith to trace at least a portion of said directive pattern with reference to the direction of reception of said signal.

18. A direction finder for determining the direction of reception of a particular radiant-energy signal comprising, a pick-up system having a directive pattern, means for controlling said pick-up system to cause said directive pattern to rotate through a predetermined azimuth, line-tracing means, means for controlling said line-tracing means to trace a first line in synchronism with the rotation of said directive pattern, means for controlling said line-tracing means to trace a second line at a frequency which is related to the frequency of rotation of said directive pattern by an integer greater than unity, means responsive to the amplitudes of signals picked up during said azimuthal rotation for shifting said first line traced by said line-tracing means in accordance therewith to trace said directive pattern with reference to the direction of reception of each of said signals, means responsive only to the amplitude of a signal picked up within a predetermined fractional portion of said azimuthal rotation for shifting said second line traced by said line-tracing means in accordance therewith to trace at least a portion of said directive pattern with reference to the direction of reception of said signal, and means for distinguishing that portion of the pattern traced by shifting said first line which is also traced by shifting said second line.

19. A direction finder for determining the direction of reception of a particular radiant-energy signal comprising, a pick-up system having a directive pattern, means for controlling said pick-up system to cause said directive pattern to rotate through a predetermined azimuth, cathode-ray line-tracing means including a first and a second line-tracing device, means for controlling the cathode-ray beam of said first device to trace a circular path in synchronism with the rotation of said directive pattern, means for controlling the cathode-ray beam of said second device to trace a circular path at a frequency which is related to the frequency of rotation of said directive pattern by an integer greater than unity, means responsive to the amplitudes of signals picked up during said azimuthal rotation for modulating the radius of the circular path traced by said first device in accordance therewith to trace said directive pattern with reference to the direction of reception of each of said signals, means responsive only to the amplitude of a signal picked up within a predetermined fractional portion of said azimuthal rotation for modulating the radius of the circular path traced by said second device in accordance therewith to trace at least a portion of said directive pattern with reference to the direction of reception of said signal, means for deriving a control effect from said signal picked up within said fractional portion of said rotation, and means for applying said control effect to said first device to distinguish that portion of the line traced by said first device which is also traced by said second device.

BERNARD D. LOUGHLIN.

REFERENCES CITED

The following references are of record in the file of this patent:

UNITED STATES PATENTS

| Number | Name | Date |
| --- | --- | --- |
| 2,208,378 | Luck | July 16, 1940 |
| 2,312,761 | Hershberger | Mar. 2, 1943 |
| 2,121,359 | Luck et al. | June 21, 1938 |

Oct. 21, 1947.                A. M. COHAN                2,429,548
                        PROPELLENT FUEL CARTRIDGE
                          Filed Sept. 20, 1943

Alvin M. Cohan
INVENTOR

BY
ATTORNEY